United States Patent
Hornbrook et al.

(10) Patent No.: US 8,057,358 B2
(45) Date of Patent: Nov. 15, 2011

(54) CONTROL FOR AN ELECTROMAGNETIC BRAKE FOR A MULTIPLE-RATIO POWER TRANSMISSION THAT HAS A BRAKE ACTUATION COUNTER

(75) Inventors: Michael J. Hornbrook, Orland, IN (US); Yeidei Wang, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 1075 days.

(21) Appl. No.: 11/900,494

(22) Filed: Sep. 12, 2007

(65) Prior Publication Data

US 2008/0045383 A1 Feb. 21, 2008

Related U.S. Application Data

(63) Continuation-in-part of application No. 11/369,245, filed on Mar. 7, 2006, now Pat. No. 7,597,651, which is a continuation-in-part of application No. 11/143,069, filed on Jun. 2, 2005, now Pat. No. 7,318,515, which is a continuation-in-part of application No. 10/760,665, filed on Jan. 20, 2004, now Pat. No. 7,000,748.

(51) Int. Cl.
*F16H 59/30* (2006.01)
*G06F 7/00* (2006.01)
(52) U.S. Cl. .......................... 477/124; 477/906; 701/66
(58) Field of Classification Search .................... 477/59, 477/60, 94, 124, 906; 475/154, 900; 74/339; 180/164; 192/13 R, 18 B; 701/51, 66
See application file for complete search history.

(56) References Cited

U.S. PATENT DOCUMENTS

| | | | |
|---|---|---|---|
| 1,851,571 A * | 3/1932 | Carl Doman | 192/13 R |
| 3,465,327 A | 9/1969 | Schroter | |
| 3,834,499 A * | 9/1974 | Candellero et al. | 477/73 |
| 3,857,468 A | 12/1974 | Iritono et al. | |
| 3,893,191 A | 7/1975 | Gold et al. | |
| 4,014,420 A | 3/1977 | Riese | |
| 4,222,471 A | 9/1980 | Hsu | |
| 4,495,457 A * | 1/1985 | Stahl | 701/62 |
| 4,694,945 A | 9/1987 | Koitabashi | |
| 4,848,527 A | 7/1989 | Kamio | |
| 4,848,531 A | 7/1989 | Gray et al. | |
| 5,172,798 A | 12/1992 | Mabee | |
| 5,209,085 A | 5/1993 | Brien | |
| 5,267,635 A | 12/1993 | Peterson et al. | |
| 5,533,425 A | 7/1996 | Mabee | |
| 5,559,286 A | 9/1996 | White et al. | |

(Continued)

FOREIGN PATENT DOCUMENTS

EP 0 822 354 B1 5/2001

*Primary Examiner* — Roger Pang
(74) *Attorney, Agent, or Firm* — Brooks Kushman P.C.

(57) ABSTRACT

A control system and method for an electromagnetic clutch brake, including an electromagnetic clutch brake actuator coil surrounding a power input shaft for a multiple-ratio transmission in a vehicle powertrain. A protective circuit of the control system normally monitors data inputs from a databus that may indicate conditions that are not favorable for clutch brake actuation. The protective circuit prevents actuation of the clutch brake under such conditions. In the event the data inputs are not available from the databus, the protective circuit permits operation in a fall-back mode in which a brake ON timer is checked prior to clutch brake actuation. A primary counter is incremented with each normal clutch brake actuation and a secondary counter is incremented with each fall-back clutch brake actuation.

14 Claims, 11 Drawing Sheets

U.S. PATENT DOCUMENTS

| | | | |
|---|---|---|---|
| 5,842,376 A * | 12/1998 | Dresden et al. | 74/336 R |
| 5,921,780 A | 7/1999 | Myers | |
| 5,931,272 A | 8/1999 | Fukushima et al. | |
| 6,105,743 A | 8/2000 | Salecker et al. | |
| 6,123,643 A * | 9/2000 | Davis et al. | 477/92 |
| 6,139,467 A | 10/2000 | Kosik et al. | |
| 6,482,123 B2 * | 11/2002 | Steeby | 477/98 |
| 6,494,810 B1 * | 12/2002 | Mack et al. | 477/174 |
| 6,622,836 B2 | 9/2003 | Otto et al. | |
| 7,318,515 B2 * | 1/2008 | Hornbrook et al. | 192/222 |
| 7,597,651 B2 * | 10/2009 | Hornbrook | 477/116 |
| 2004/0180747 A1 * | 9/2004 | Weilant et al. | 475/154 |

\* cited by examiner

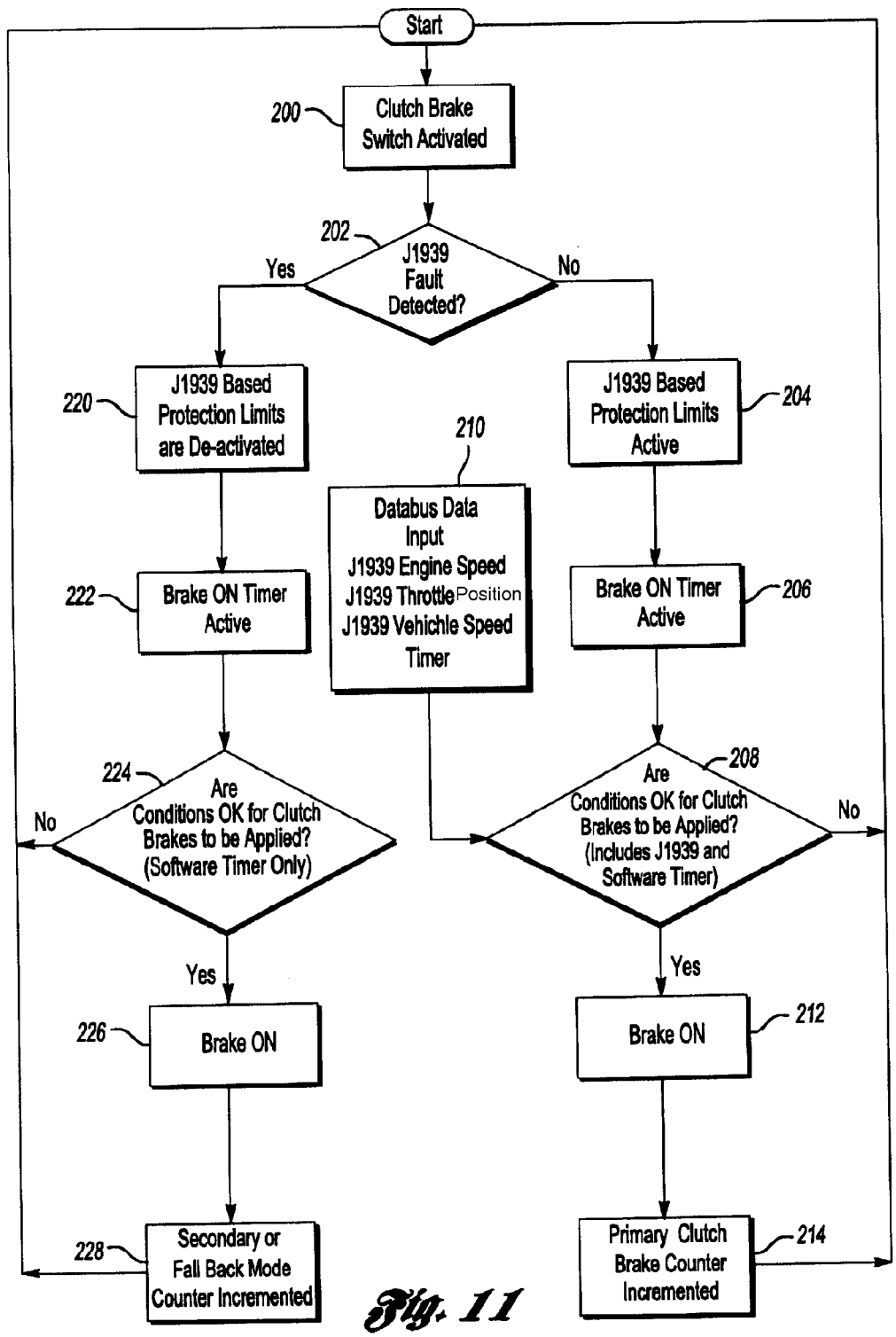

CONTROL FOR AN ELECTROMAGNETIC BRAKE FOR A MULTIPLE-RATIO POWER TRANSMISSION THAT HAS A BRAKE ACTUATION COUNTER

CROSS-REFERENCE TO RELATED APPLICATIONS

This application is a continuation-in-part of U.S. application Ser. No. 11/369,245, filed Mar. 7, 2006, now U.S. Pat. No. 7,597,651, issued Oct. 6, 2009 which is a continuation-in-part of U.S. application Ser. No. 11/143,069, filed Jun. 2, 2005, now U.S. Pat. No. 7,318,515, issued Jan. 15, 2008 entitled "Electromagnetic Brake for a Multiple-Ratio Power Transmission in a Vehicle Powertrain," which is a continuation-in-part of U.S. application Ser. No. 10/760,665, filed Jan. 20, 2004, now U.S. Pat. No. 7,000,748, dated Feb. 21, 2006 entitled "Clutch Brake."

BACKGROUND OF THE INVENTION

1. Field of the Invention

A protection circuit and controller for an electromagnetic friction brake for a heavy-duty power transmission for controlling deceleration of a torque input shaft for the transmission during transmission ratio changes.

2. Background Art

A powertrain for a heavy-duty vehicle, such as a truck or a tractor trailer, typically has an engine that is connected by a master clutch, under the control of the vehicle driver, to a power input shaft for a multiple-ratio geared transmission. Driver operated shift rails and shift forks can be used to establish and interrupt torque flow paths through selected gear elements of the multiple-ratio transmission. Ratio changes can be accomplished manually by shifting synchronizer clutch sleeves into and out of engagement with companion gear elements or by shifting non-synchronized gear or clutch elements. The gear elements may form a driving torque flow path through a transmission main shaft and a countershaft to a torque output shaft.

Multiple-ratio transmissions of this type, as well as heavy-duty power transmission mechanisms with power actuated clutches for establishing and interrupting torque flow paths through the gearing, are well known. A ratio changing shift sequence typically involves disengagement of the master clutch to interrupt power flow from the vehicle engine to the torque input shaft of the transmission as the transmission clutch elements are selectively engaged and disengaged. When the master clutch is disengaged, a torque input shaft for the transmission must decelerate so that the gear elements of the on-coming torque flow path are generally synchronized.

A brake may be used to facilitate shifting of the transmission gearing by decelerating the transmission torque input shaft thereby decreasing the time required to accomplish a ratio shift. A torque input shaft brake is especially useful when the vehicle driver initiates a shift from neutral to low ratio or from neutral to reverse after disengaging the master clutch.

It is known in the art to provide a transmission input shaft brake that includes a friction member connected in a driving relationship, such as by splines, to the transmission torque input shaft. The transmission master clutch is disengaged by a master clutch release mechanism so that when the master clutch is disengaged, the release mechanism may apply a brake engaging force on the transmission input shaft brake. Friction brake elements of the input shaft brake are frictionally engaged to create a frictional drag torque that decelerates the transmission input shaft.

Co-pending patent application Ser. No. 10/760,665, filed Jan. 20, 2004, now U.S. Pat. No. 7,000,748, issued Feb. 21, 2006, discloses a transmission input shaft brake with an electromagnetic brake actuator. That co-pending application is assigned to the assignee of the present invention. The electromagnetic brake disclosed in the co-pending application comprises an armature that is secured to the transmission input shaft adjacent a friction surface formed on an adjacent transmission housing wall. When the brake is energized, the armature is frictionally engaged with a stationary friction surface on the transmission housing wall thereby retarding or preventing rotation of the transmission torque input shaft at the outset of a ratio shift.

The electromagnetic brake of the co-pending application creates a magnetic flux flow path that is defined in part by a brake armature. The flux flow path envelopes portions of the transmission, including the transmission input shaft, a transmission input shaft bearing and bearing cover, and portions of the driver operated master clutch release mechanism.

The electromagnetic input shaft brake disclosed in the co-pending application includes a housing, which may replace a transmission input shaft bearing cap typically found on heavy-duty transmissions. The electromagnetic brake includes coil windings that are placed close to the input shaft to reduce the length of the coil windings and to reduce the amount of copper required in the manufacture of the coil. Typically, the electromagnetic brake is strategically positioned to minimize the space required to accommodate it in the transmission assembly.

The magnetic lines of flux created as the transmission input shaft brake is activated pass through the transmission input shaft and surrounding portions of the transmission that are of high carbon content, which may be magnetized following a period in which the transmission input shaft brake is frequently activated. It is possible, for example, for the transmission input shaft to be partially magnetized with a residual magnetic intensity that can remain even after the brake is de-energized. The transmission housing, which typically is formed of cast aluminum or cast iron with a low carbon content, does not readily become magnetized because those materials are relatively poor conductors for magnetic flux fields. The input shaft itself, however, as well as the bearing elements and other transmission elements and seal covers, are formed of high carbon steel and are in close proximity to the input shaft brake.

The return flux flow path in an arrangement of this type typically includes an armature plate of the input shaft brake, which may be a solid disk design because of its ease of manufacture and its low cost.

Because of partial or residual magnetization of transmission components in proximity to the input shaft brake, ferrous particles in an operating environment for the transmission can be attracted to rotary portions of the transmission and damage transmission bearings, seals and other transmission components.

An input shaft brake should not be engaged if the vehicle speed, idle speed, or when an operator is depressing the accelerator pedal because damage could result to the clutch or transmission. The input shaft brake control system may be difficult to program due to differences in engine set-up parameters required by different vehicle manufacturers. Differences in engine operating parameters and in different conditions make it difficult to always assure proper operation of the input shaft brake in conjunction with the transmission.

The input shaft brake control system may be subject to thermal or electrical overloading if there is excessive braking or if the current draw exceeds a safe limit. Thermal or electrical overloading of the control system may adversely effect the control system and reduce reliability of the system.

The electromagnetic brake may be connected to a databus that provides data inputs that monitor conditions that may be appropriate or inappropriate for energizing the brake stator coil. When the protection circuit senses that it is not appropriate to energize the coil, the brake is prevented from engaging. If the connection to the databus is interrupted, the brake will be permitted to engage, but a counter will be incremented to count unprotected brake engagements. A counter may also be used to count brake engagements while the protective circuit is operational. The counts from the counters may be checked when the system is serviced.

The above problems and others are addressed by applicants' invention as summarized below.

SUMMARY OF AN EMBODIMENT OF THE INVENTION

An electromagnetic brake and brake control system is provided for a vehicle powertrain for a wheeled vehicle. The powertrain comprises an engine, a multiple-ratio power transmission having a housing enclosing multiple-ratio gear elements, a power output shaft driveably connected to vehicle traction wheels, a power input shaft driveably connected to the multiple-ratio gear elements, and a master clutch selectively connecting the power input shaft to the engine. The master clutch is enclosed by a master clutch housing forming a part of the transmission housing.

The electromagnetic brake comprises a stator coil housing secured to the transmission housing, the stator coil housing encloses a stator coil that surrounds the power input shaft and defining with the coil housing an electromagnetic pole face. An armature plate has a hub portion secured to the power input shaft and a peripheral portion disposed adjacent the brake stator coil. A control system electrically energizes the brake stator coil thereby effecting frictional engagement of the armature plate with the pole face. An electromagnetic flux flow path is established around the coil through the stator coil housing and the peripheral armature plate portion.

The control system may include sensors for determining whether the master clutch is disengaged, whether the transmission is in neutral, whether low transmission speed ratio is selected, whether reverse speed is selected, whether reverse speed is selected, whether the accelerator pedal is depressed, and whether vehicle speed is less than a predetermined value, or other conditions. The above signals may be available from a vehicle datalink, such as a CAN based J1939 datalink. If the data from the datalink is unavailable, the electromagnetic brake will continue to operate based upon an input signal from the clutch brake activation switch. For example, the clutch brake activation switch may be actuated when the clutch pedal is near or at the end of travel for the clutch pedal.

A stator coil circuit includes a voltage source and a switch for opening and closing the coil circuit. A thermally responsive circuit protector may be provided in the coil circuit for sensing the temperature of the stator coil whereby overheating of the stator coil is avoided. The stator coil circuit may also include an overcurrent protector for opening the stator coil circuit when current in the stator coil exceeds a predetermined value.

A primary counter may be provided as part of the control system that is incremented upon each clutch brake activation under normal circumstances, i.e., when the protection circuit based upon protection limits set by the control algorithm that are based on the datalink inputs. Activation of the electromagnetic brake when the protection circuit is operational are considered normal actuations.

A secondary counter may be provided to count electromagnetic brake actuations when the data signals are not available from the datalink and the system is operating based upon an input signal from the clutch brake activation switch. Operation in this mode may be considered a harsh operation in which only limited protection is available for the brake. In such actuations, the brake may see excessive wear due to the brake being activated under conditions that would normally be prohibited by the protection algorithm. The secondary counter keeps tracks of engagements that occur while the protection circuit is disabled.

The primary counter increments upon each clutch brake activation when the protection circuit is operational. The secondary counter is active if a datalink fault code is set upon detection of the loss of a connection to the datalink. In the fall-back mode, each actuation of the electromagnetic brake increments a secondary counter.

The primary counter and secondary counter may be inspected periodically to determine if the clutch brake has operated without the datalink based protection limits. If so, a service technician may determine how many activations occurred without the datalink protection limits. The information from the counters may aid in diagnosis of wear and also provide valuable information regarding usage of the electromagnetic clutch brake and the extent of wear of the clutch brake.

These and other aspects of the invention will be apparent from the following drawings and detailed description of an embodiment of the invention.

BRIEF DESCRIPTION OF THE DRAWINGS

FIG. 11 is a software flow diagram demonstrating the input shaft electromagnetic brake control strategy wherein a primary counter and a secondary counter are provided to monitor brake actuation and wear in different modes of operation.

DETAILED DESCRIPTION OF AN EMBODIMENT OF THE INVENTION

Figure 1:
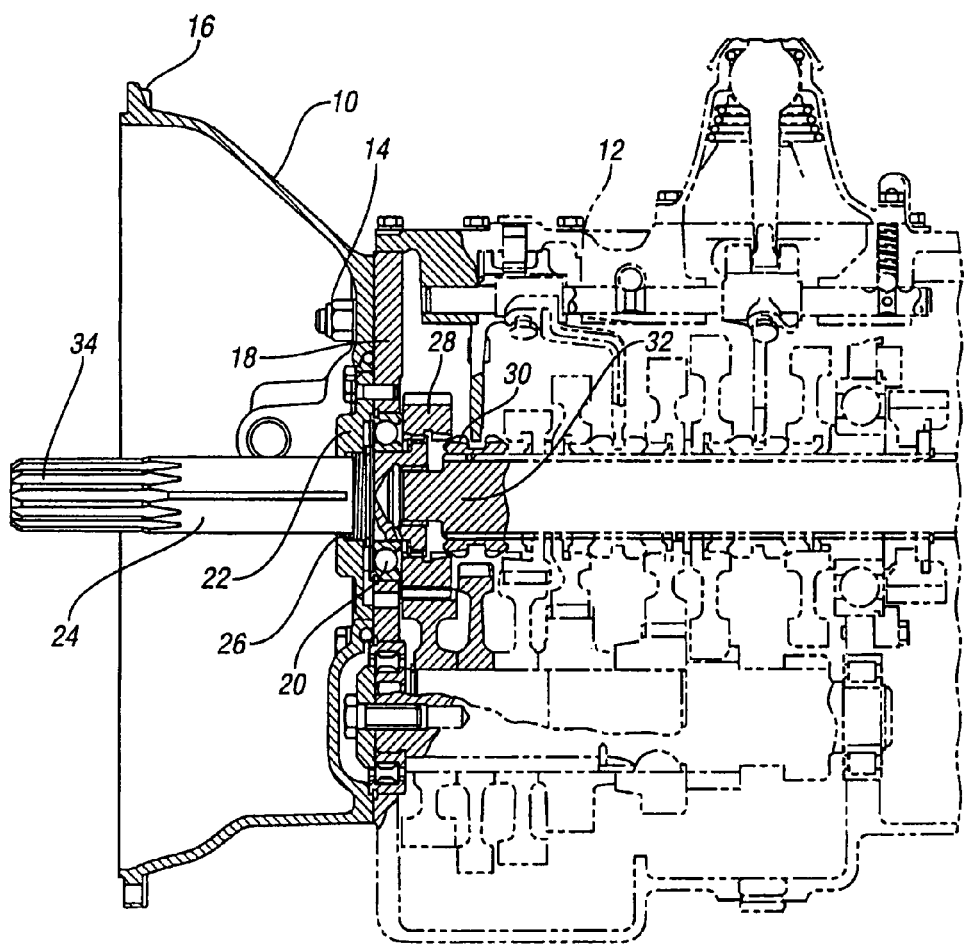
FIG. 1 is a partial cross-sectional view of a prior art multiple-ratio heavy-duty power transmission mechanism that is capable of incorporating the present invention.

FIG. 1 shows a known multiple-ratio heavy-duty truck transmission capable of embodying the electromagnetic input shaft brake of the invention. The transmission of FIG. 1 is an example of a number of transmissions that could incorporate the electromagnetic brake of the invention. For example, multiple-ratio transmissions in automotive powertrains with synchronizers for effecting synchronized engagement of torque transmitting gear elements could be used. Other transmissions that could be used would include automated ratio shifting transmissions with pneumatic or hydraulic shift actuators.

The transmission of FIG. 1 includes a clutch bell housing 10 and a main transmission housing 12 that are secured together by bolts 14 to form a transmission housing assembly. The bell housing 10 can be bolted at 16 to the engine flywheel housing of an internal combustion engine.

The transmission housing includes a forward bearing support wall 18 with a central bearing opening that receives and supports a main transmission ball bearing 20. A bearing cap 22 is secured to the wall 18. A transmission input shaft 24 extends through the bearing cap and is supported by bearing 20. A lubrication oil seal 26 surrounds the input shaft 24 and is retained by the bearing cap 22.

Figure 2:
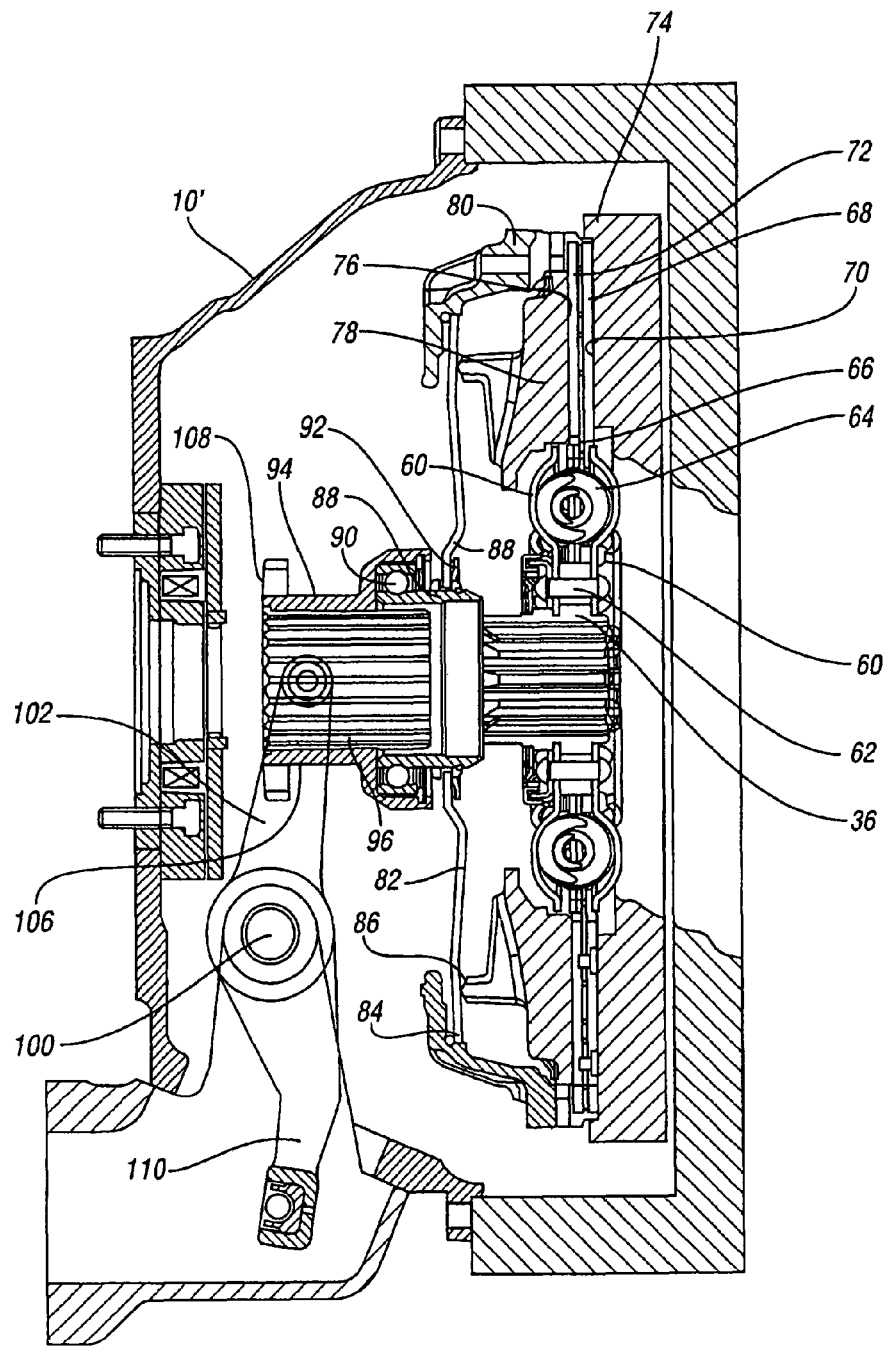
FIG. 2 is a partial cross-sectional view of a master clutch for the transmission of FIG. 1 and an electromagnetic brake for the input shaft of the transmission.

Torque input shaft 24 may be driveably connected to a torque input gear 28 of the transmission mechanism. Gear 28 can be engaged driveably to countershaft gears in known fashion. It may be connected also by a dog clutch 30 to a transmission main shaft 32 in known fashion. Torque input shaft 24 is splined at 34 to establish a driving connection with an internally splined friction clutch hub 36, as seen in FIG. 2.

Figure 2A:
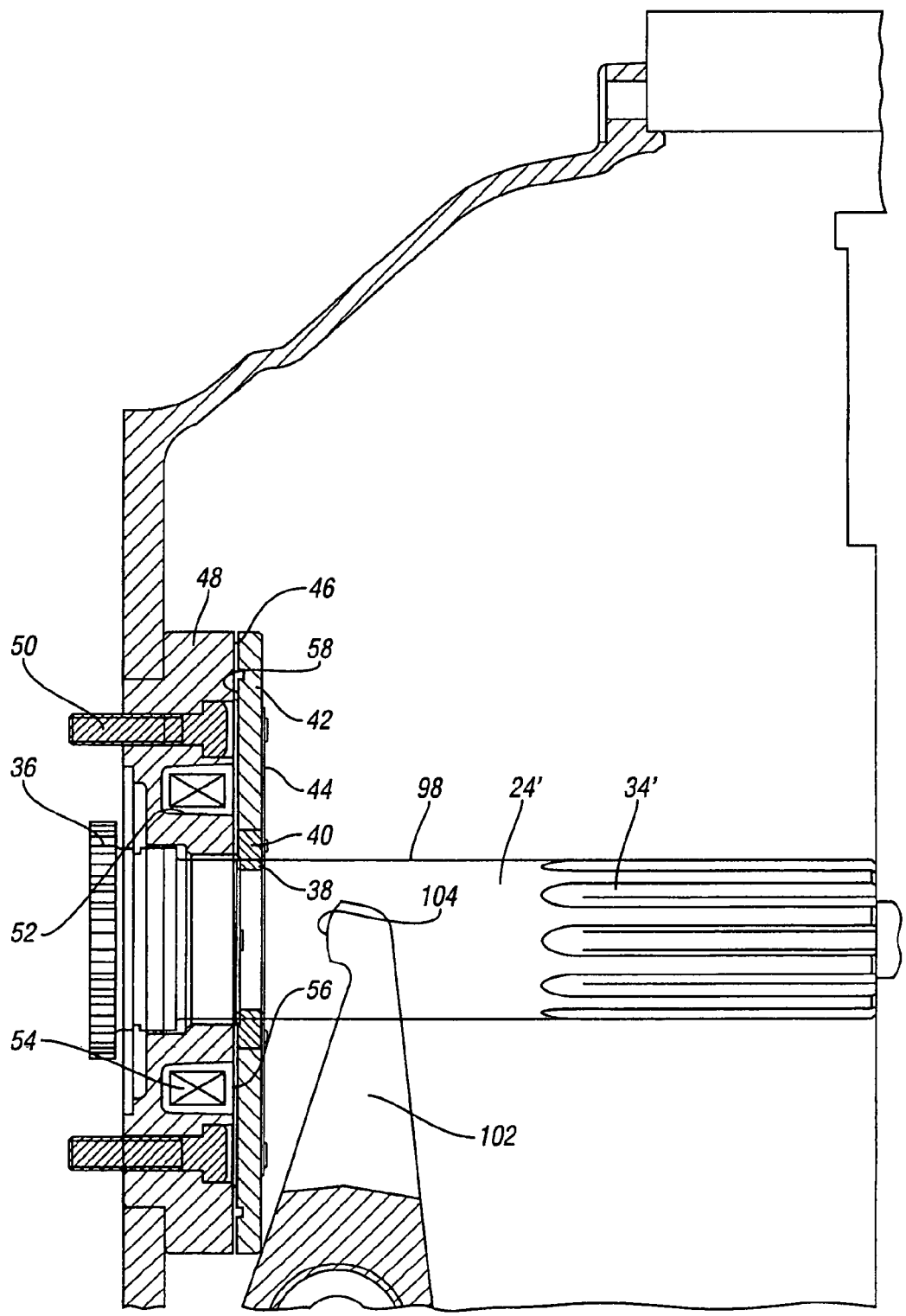
FIG. 2a is an enlarged partial cross-sectional view of an electromagnetic brake for the input shaft, together with a portion of the transmission input shaft assembled with the electromagnetic input shaft brake.

The input shaft 24 of the known construction of FIG. 1 corresponds to the input shaft 24' of the construction of FIG. 2a. Likewise, the splined portion 34' of the construction of FIG. 2a corresponds to the splined portion 34 of the known construction of FIG. 1.

The input shaft 24' of FIG. 2a is provided with an externally splined portion 37, which registers with an internally splined gear element (not shown), which would correspond to torque input gear element 28 of the known construction of FIG. 1. The torque input shaft 24' is connected at 38, such as by a spline or a key, to an armature ring 40, thereby establishing a driving connection between torque input shaft 24' and armature plate 42. The ring 40 is connected to armature plate 42 by spring straps 44, which permit axial displacement of the plate 42 in the direction of the axis of the shaft 24'. A small air gap 46 is provided between the armature plate 42 and an electromagnetic brake housing 48 (sometimes referred to as a clutch-brake housing). The housing 48 is secured by bolts or other suitable fasteners 50 to a forward wall of the transmission housing, which corresponds to the wall 18 seen in FIG. 1.

The housing 48 is provided with an annular pocket 52, which receives electromagnetic coil windings 54. An annular pole face is provided, as shown at 56. The face 56 is situated directly adjacent and in juxtaposition with respect to an annular face 58 of the armature plate 42. When windings 54 are energized by an activating current, the armature plate 42 is shifted into engagement with the friction face 46 of the electromagnetic brake housing 48.

Figures 3, 3A:
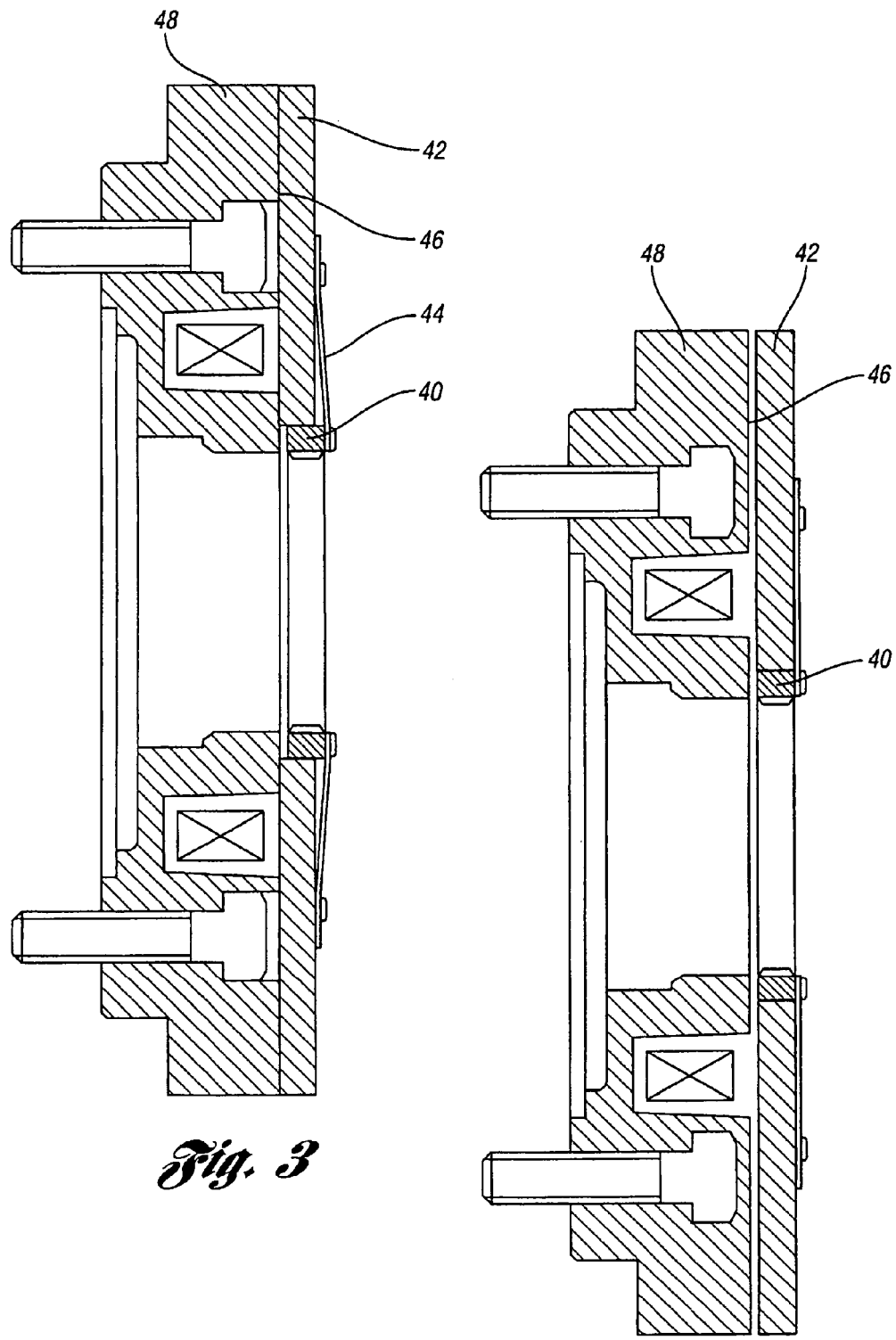
FIG. 3 is a cross-sectional view of the electromagnetic transmission input shaft brake illustrated in FIG. 2a with the electromagnetic brake in the engaged state.
FIG. 3a is a view corresponding to the view of the input brake in FIG. 3 wherein the brake is in a disengaged state.

FIG. 3 shows the electromagnetic brake assembly of FIGS. 2 and 2a when the coil windings are energized. At this time, the armature plate 42 is in frictional engagement with the friction surface 46 of the housing 48. The spring straps 44 flex, as shown in FIG. 3, as the armature plate 42 is shifted toward the housing 48.

FIG. 3a shows the position of the armature plate 42 when the coil windings are de-energized. The residual spring force of the spring straps 44 move the armature plate 42 out of engagement with the surface 46.

When the coil windings are energized, rotary motion of the input shaft 24' will be resisted by the frictional torque established by the electromagnetic brake thereby decelerating the input shaft 24'.

FIG. 2 shows a master clutch construction for use in a transmission having an input shaft corresponding to the shaft 24 of FIG. 1 or the shaft 24' of FIG. 2a. The spline portion 34' of FIG. 2a is driveably engaged with the internally splined clutch hub 36. A damper spring cage 60 is secured driveably to the hub 36, preferably by rivet elements 62. Damper springs 64 are received in the cage 60. The springs 64 engage a clutch drive plate 66 thereby establishing a resilient driving connection between the hub 36 and the clutch plate 66. Clutch friction materials 68 and 72 are secured on both sides of the clutch plate 66. Friction material 68 is situated adjacent a friction surface 70 on engine flywheel 74. Friction material 72 is situated directly adjacent friction surface 76 of clutch pressure plate 78, which is located within rotary clutch housing 80, the latter being secured to the flywheel 74 so that they rotate together. Pressure plate 78 is connected at its periphery to the clutch housing 80, the connection accommodating axial displacement of the pressure plate 78 relative to the clutch housing 80.

A diaphragm clutch actuator spring 82 is anchored at its periphery to the clutch housing 80, as shown at 84. An intermediate portion of the diaphragm spring actuator 82 engages a pressure point on the pressure plate 78, as shown at 86. The radially inward margin 89 of the diaphragm spring 82 surrounds an inner bearing race 89 for clutch release bearing assembly 90. Axial displacement of the inner race 89 will cause axial shifting movement of the inner margin 89 of the diaphragm spring 82 as a collar 92 carried by the inner race 88 engages the periphery 89.

An outer race for the bearing 90 is an integral portion of clutch release bearing sleeve 94, which is provided with lubricating oil grooves 96 extending in an axial direction, as indicated in FIG. 2. The sleeve 94 is mounted about the axis of input shaft 24', in known fashion, between the electromagnetic brake housing 48 and the spline portion 34'. The clutch release mechanism includes a lever that is pivoted at 100 on the clutch bell housing. An arm 102 of the release lever has an actuator end 104, as seen best in FIG. 2a, which enters an annular space 106 seen in FIG. 2. The space 106 is defined by a ring 108 secured to the sleeve 94 and by the release bearing 90.

The radially outward arm 110 of the release lever extends through the bell housing, shown at 10', which corresponds to the bell housing 10 of FIG. 1. A suitable actuator mechanism (not shown), which is under the control of the vehicle operator and which is mechanically connected to a transmission clutch pedal, will rotate the clutch release lever to effect shifting movement of the sleeve 94 in a left-hand direction against the opposing force of the diaphragm spring 82. The master clutch normally is engaged under the spring force of the diaphragm spring 82. When the clutch release sleeve 94 is shifted in a left-hand direction as seen in FIG. 2, the clutch engaging force at 86 is released, and the pressure plate 78 is shifted out of engagement with the clutch plate 66.

Figure 4:
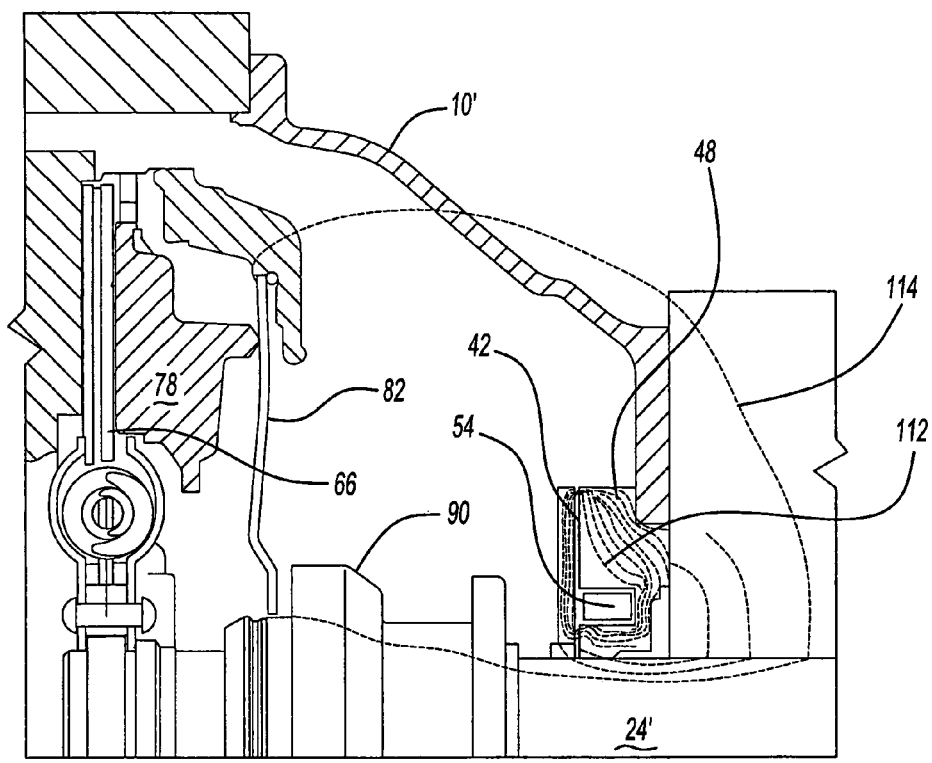
FIG. 4 is a schematic diagram of the electromagnetic brake of FIG. 2a wherein lines of flux of varying intensity are illustrated.

FIG. 4 illustrates the flux flow path and magnetic field intensity for the electromagnetic input shaft brake of FIGS. 2 and 2*a*. The flux flow path illustrated in FIG. 4 is identified by using magnetic finite element analysis software. FIG. 4 indicates that a magnetic flux field of maximum intensity at location 112 is in a flux flow circuit defined in part by the electromagnetic clutch-brake housing 48 and the armature 42. The path envelopes in part the input shaft 24', the region occupied by the main transmission roller bearing assembly and the bell housing 10' itself.

The intensity of the magnetic flux field decreases as the field flux flow lines separate from the vicinity of the electromagnetic brake coil windings. Flux flow lines shown at 114 are of lower intensity, but they envelope several transmission elements that are formed of magnetic material, such as the diaphragm spring 82, the clutch housing and the release bearing elements.

Figure 5:
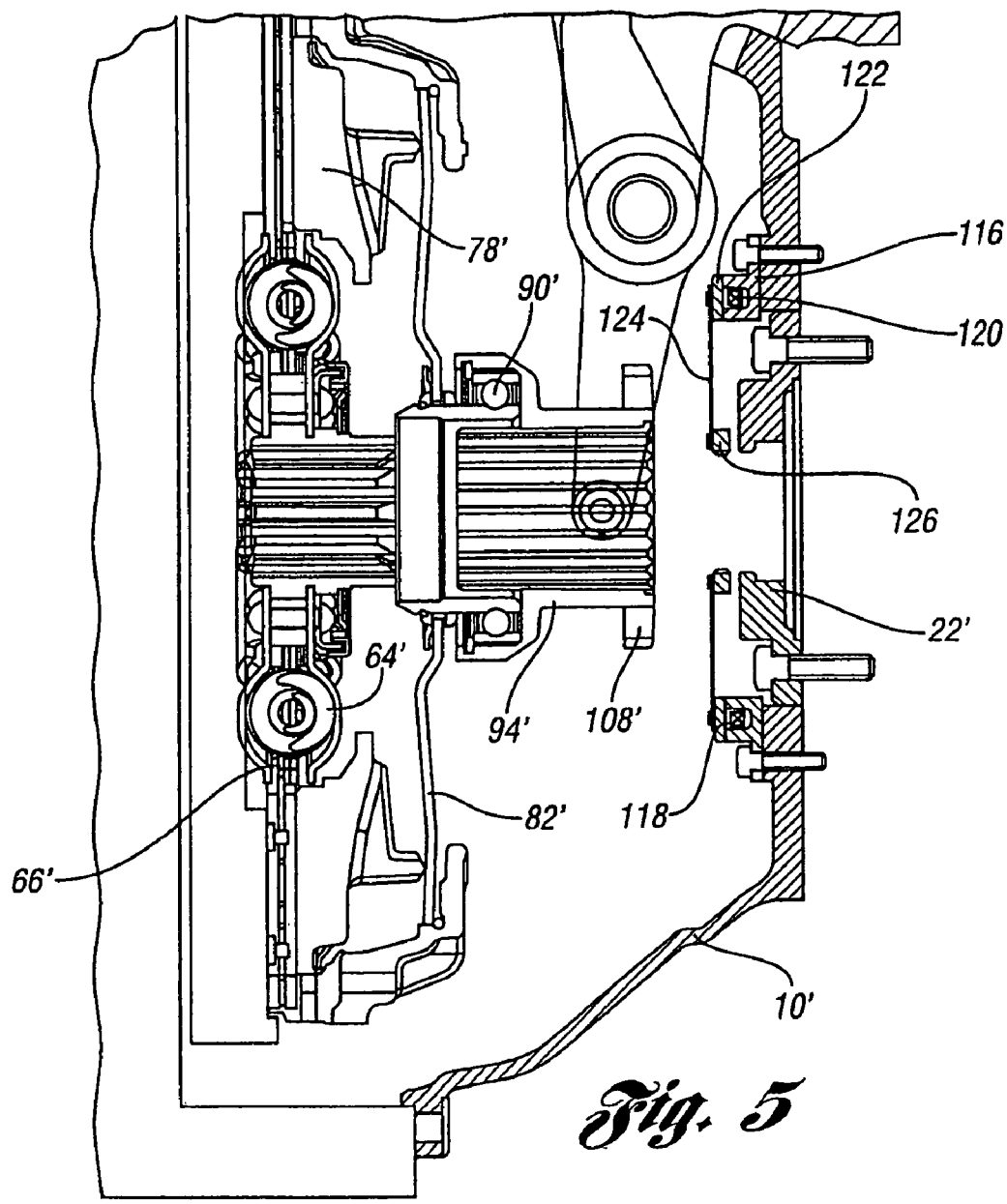
FIG. 5 is a partial cross-sectional view of a master clutch assembly, together with an electromagnetic brake for the input shaft of a multiple-ratio transmission in accordance with the teachings of the present invention.

FIG. 5 shows the design of the present invention, wherein the electromagnetic clutch housing is physically separated from the torque input shaft for the transmission. In the design of FIG. 5, the bearing cap does not form a part of the electromagnetic clutch-brake housing. The bearing cap is illustrated in FIG. 5 at 22', which corresponds to the bearing cap illustrated in the known design of FIG. 1. At a radially outward location with respect to the bearing cap 22' is an electromagnetic clutch-brake housing 116.

The master clutch elements and the clutch release bearing of FIG. 5 may be similar to the clutch and clutch release bearing illustrated in FIG. 2. Reference numerals used in identifying the elements of the master clutch assembly in the clutch release bearing in FIG. 5 are the same as the corresponding elements of the FIG. 2 construction, although prime notations are added to numerals used in FIG. 5.

The electromagnetic clutch-brake housing 116 is provided with a pocket 118, which receives electromagnetic coil windings 120. The diameter of the coil windings in FIG. 5 is larger than the diameter of the coil windings shown in FIGS. 2, 2*a* and 3. They are remotely situated with respect to the transmission torque input shaft and the transmission main ball bearing. The clutch-brake housing 116 is bolted or otherwise secured to bell housing 10', although it could instead be secured to transmission housing wall 18. The bell housing 10', for purposes of this description, can be considered to be a part of the transmission housing.

A brake armature plate 122 is secured to the outer periphery of a flexible brake plate 124. The inner periphery of the brake plate 124 is secured to ring 126, which corresponds to the ring 40 shown in FIG. 2*a*.

Figure 6:
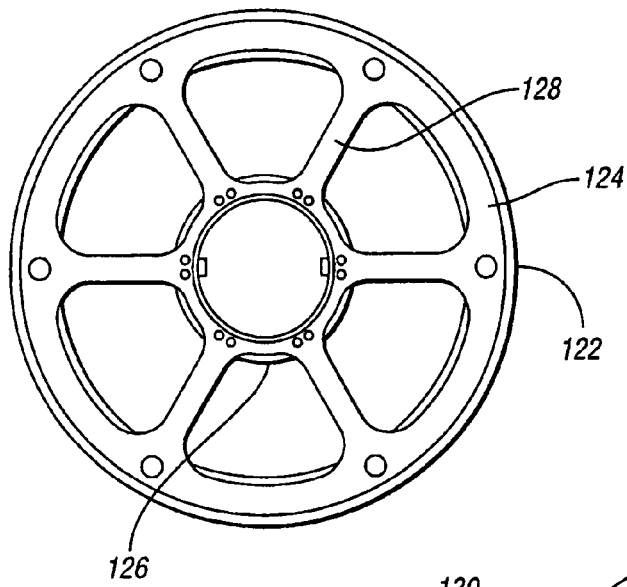
FIG. 6 is a detailed plan view of an armature, which forms a part of the electromagnetic input shaft brake of FIG. 5.

Details of the construction of the armature plate and the flexible plate 124 are shown in FIG. 6. The flexible plate 124 comprises radially extending flexible arms 128. The outer margin of the flexible arms is secured to the armature plate 122. The inner periphery of the flexible plate 124 is secured to armature ring 126.

Figure 6A:
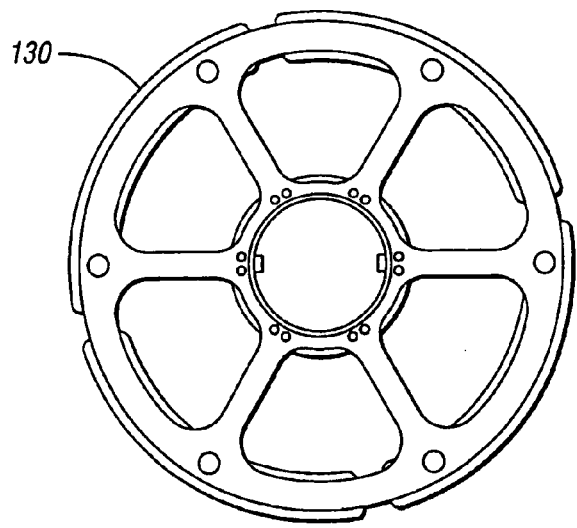
FIG. 6a is a modified armature design corresponding to the design of FIG. 6 wherein the friction member of the armature is formed in multiple sections.

FIG. 6*a* shows an alternate construction in which the armature plate 122 is formed in four separate segments 130. Although four segments are shown, it is possible to use a different number of segments if that would be preferred.

Unlike the design indicated in FIG. 2, where the armature plate freely establishes a flux flow path when the electromagnetic coil windings are energized, the design of FIG. 6 and the design of FIG. 6*a* provide a restricted flux flow path through flexible arms 128 in an inward radial direction toward the transmission input shaft. To further isolate surrounding elements of the transmission from the flux flow path, the armature ring 126, which forms a hub for the armature, can be made of non-magnetic stainless steel.

Figure 7:
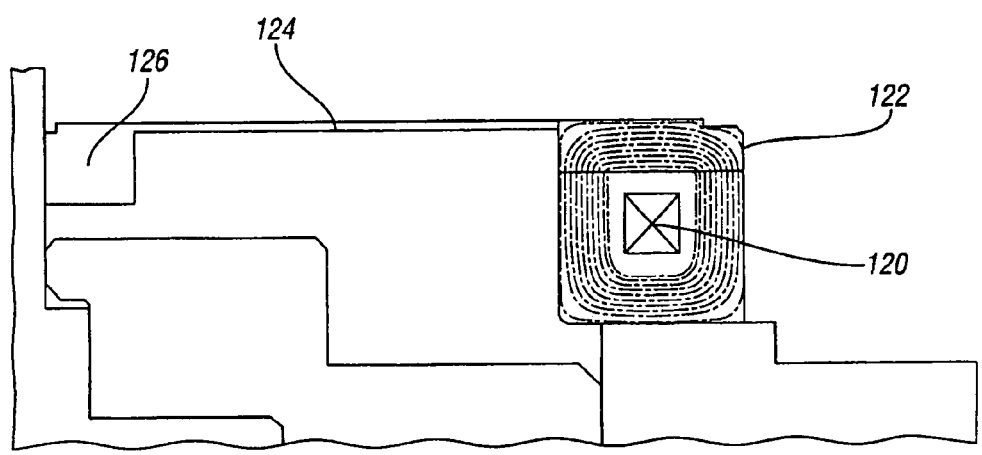
FIG. 7 is a diagram illustrating the magnetic flux flow circuit for the electromagnetic brake illustrated in FIG. 5.

FIG. 7 shows the path followed by the flux flow lines when the windings at 120 are energized. The input shaft is not enveloped by the magnetic flux flow lines, and the flux density illustrated in FIG. 7 is concentrated in the electromagnetic brake where magnetic effects are desired. The armature plate 122 or the armature plate segments 130 establish a closed loop pattern as the flux flow lines are transferred from one electromagnetic pole to the other. The pattern for the flux flow lines of FIG. 7 are distinct from the pattern illustrated in FIG. 4, and the envelope for the flux flow lines is much more concentrated thereby avoiding undesired magnetization of the surrounding transmission elements, the bearing elements, the torque input shaft, the seal elements and the clutch bell housing itself. The magnetic flux flow path does not jump to adjoining components. With the design of FIG. 7, the opportunity for abrasive ferrous particles to gather and damage rotary elements of the transmission, bearings and seals is substantially eliminated.

To further isolate the flux flow path, mounting fasteners for the electromagnetic brake may be made of non-magnetic material such as aluminum or stainless steel, which isolates the flux conductors from the surrounding components of the transmission and the master clutch.

Figure 8:
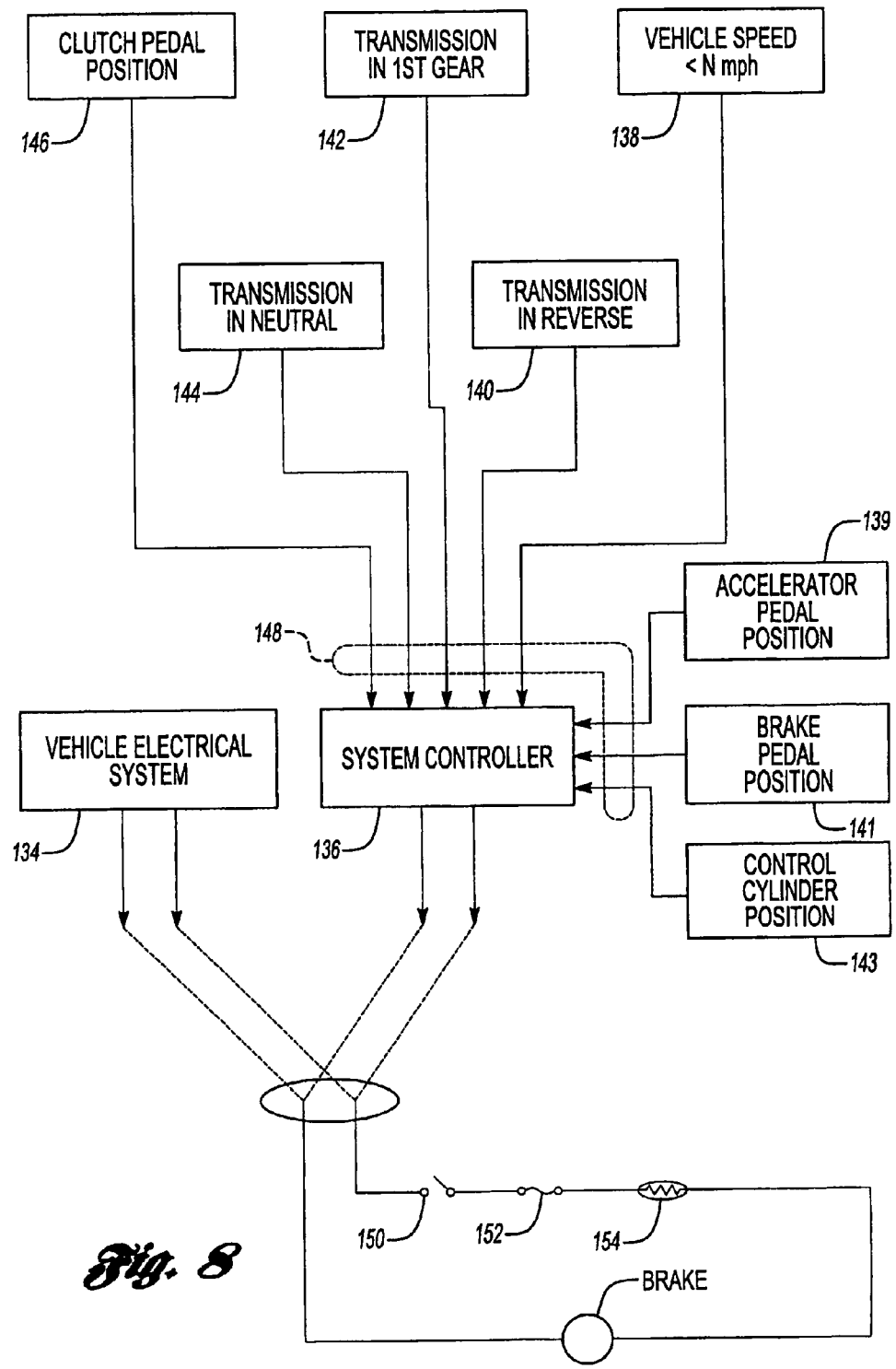
FIG. 8 is a schematic controller diagram for the control of the electromagnetic brake illustrated in FIG. 5.
Figure 9:
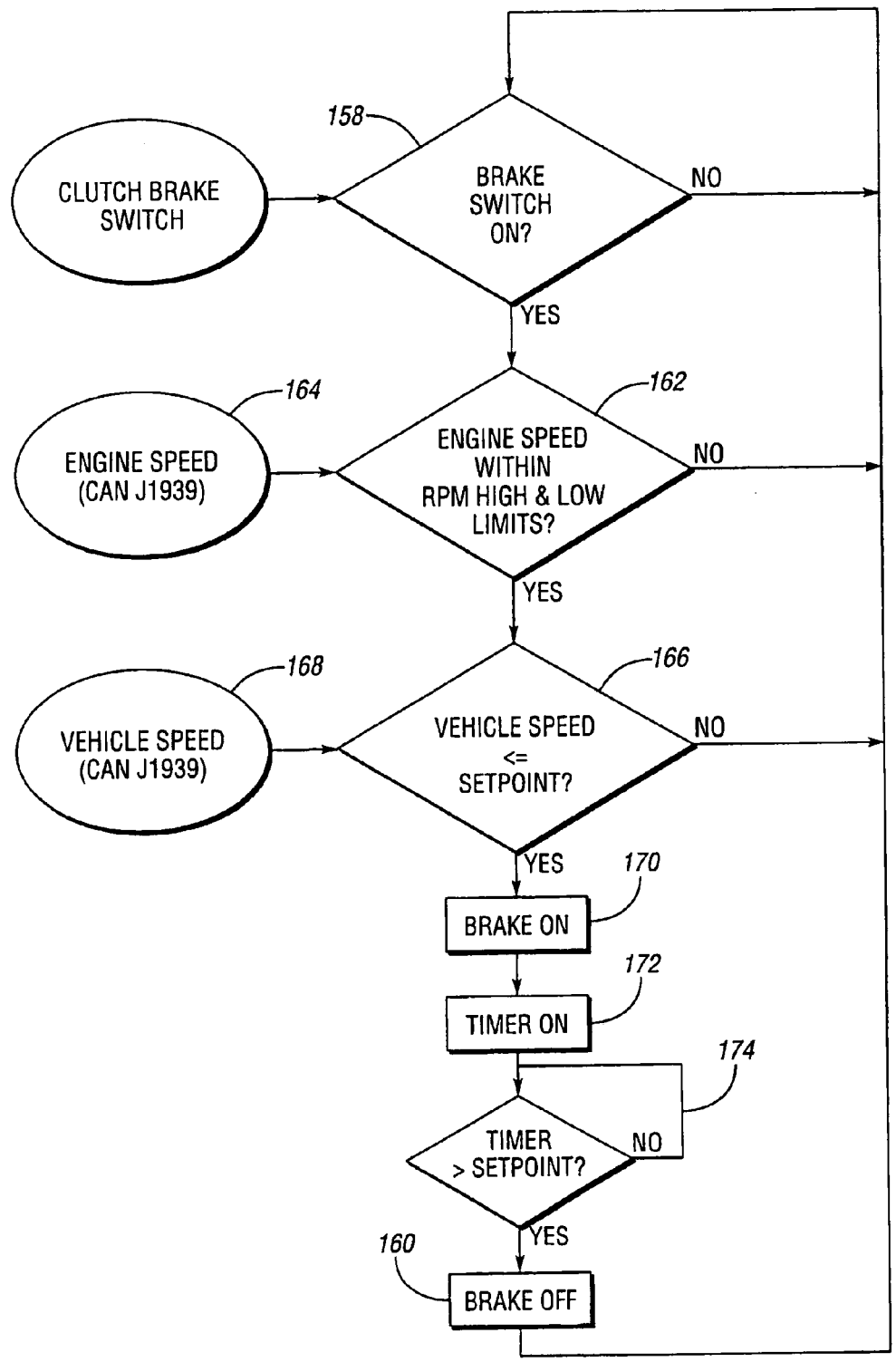
FIG. 9 is a software flow diagram demonstrating the input shaft electromagnetic brake control strategy for the electromagnetic brake of FIG. 5.

The controller for the electromagnetic brake is schematically illustrated in FIG. 8, and a control algorithm for the electromagnetic brake is illustrated in FIG. 9. The brake control strategy will control activation of the brake mechanism independently of the release bearing position, unlike a conventional transmission torque input shaft brake, previously described. The brake control includes a thermal protection device to prevent overheating due to excessive current or excessive braking.

The electromagnetic brake may operate with a voltage source of 12 to 42 volts DC and may be controlled by a remotely placed switch in a convenient location. The switch may be located, for example, in the master cylinder of a hydraulic linkage or a clutch pedal linkage or a clutch release mechanism. Upon closure of the switch, which may be normally open, the coil windings for the brake will become energized thereby creating a magnetic field for braking the armature plate. In the alternative, the remote control switch can be used to activate a control relay, which in turn closes a set of normally-open switch contacts. Upon closure of the normally open switch contacts, power is supplied to the electromagnetic coil through a circuit protection device.

The circuit protection device, as shown at 154 in FIG. 8, is placed in series with the coil and will interrupt the current flow path if the current draw exceeds a safe limit or if the temperature build-up in the brake exceeds predefined temperature limits.

The control system of FIG. 8 includes a vehicle electrical system 134 and a brake system controller 136. Control input signals for the controller 136 may include signals from a vehicle speed sensor 138, an accelerator pedal position sensor 139, a transmission reverse sensor 140, a brake pedal position sensor 141, a transmission first gear sensor 142, a control cylinder position sensor 143, a transmission neutral sensor 144, and a master clutch pedal position sensor for the master clutch, as shown at 146. These signals are distributed through a control area network bus, as shown at 148, to the controller 136. The power source for the electromagnetic brake may be the vehicle electrical system 134. The brake controller 136 ensures that the brake can be activated only when the engine is running, a fuel solenoid for the engine is energized and an ignition switch is in the key-on position. It responds to signals from sensors 146, 152 and 148, 144 and 140 and allows brake engagement only when the master clutch is disengaged and the vehicle speed is less than a predetermined value "N." It determines whether the transmission is in neutral and whether first gear or reverse has been selected.

An alternative control strategy may use inputs from sensors such as, for example, the accelerator pedal position sensor 139, the brake pedal position sensor 141, and the control cylinder position sensor 143. The accelerator position sensor 139 may be used instead of the engine speed signal because different engines may be calibrated to idle at different speeds. If the accelerator pedal is at least partially depressed, this indicates that the operator is seeking to accelerate the engine above idle which is inconsistent with proper engagement conditions for the input shaft brake. Since accelerator pedal position, brake pedal position, and transmission in neutral input signal inputs are not normally provided on a J1939 bus they may require separate wiring to the system controller 136.

The switch that opens or closes the brake circuit is shown at 150. An over-current protection device, such as a fuse, can be used as shown at 152. The circuit protection device 154 may include a thermally activated switch that prevents overheating due to prolonged usage or due to high current.

A control algorithm, seen at FIG. 9, will prevent torque input shaft brake (clutch-brake) activation when the vehicle engine is off, if the vehicle is moving, or if a preset timer is timed out. The timer prevents the electromagnetic brake from being abused if the vehicle clutch pedal is held down by the operator for an extended period of time.

In FIG. 9, the strategy will determine at 158 whether the clutch brake switch is "on." If it is not on, the control routine will maintain the brake in an "off" state, as shown at 160. If the brake switch is on, the routine determines at decision block 162 whether the engine speed is within a high speed limit or a low speed limit.

The engine speed is measured, as indicated at 164. If the engine speed is not within predetermined limits, the routine will maintain the brake in an "off" position, as shown at 160.

If the engine speed is within the high and low limits, a decision is made at decision block 166 to determine whether the vehicle speed, measured as shown at 168, is less than a precalibrated set point. If the vehicle speed is higher than the set point, the brake will be kept "off" as shown at 160. If the vehicle speed is less than the set point, the brake is applied, as shown at 170.

When the brake is on, it is determined, as the routine continues, whether the timer is on. This is done at action block 172. If the timer is not timed out, the routine will continue, as shown at 174. If the timer value is greater than the set point, however, the brake will be kept off as shown at 160.

Figure 10:
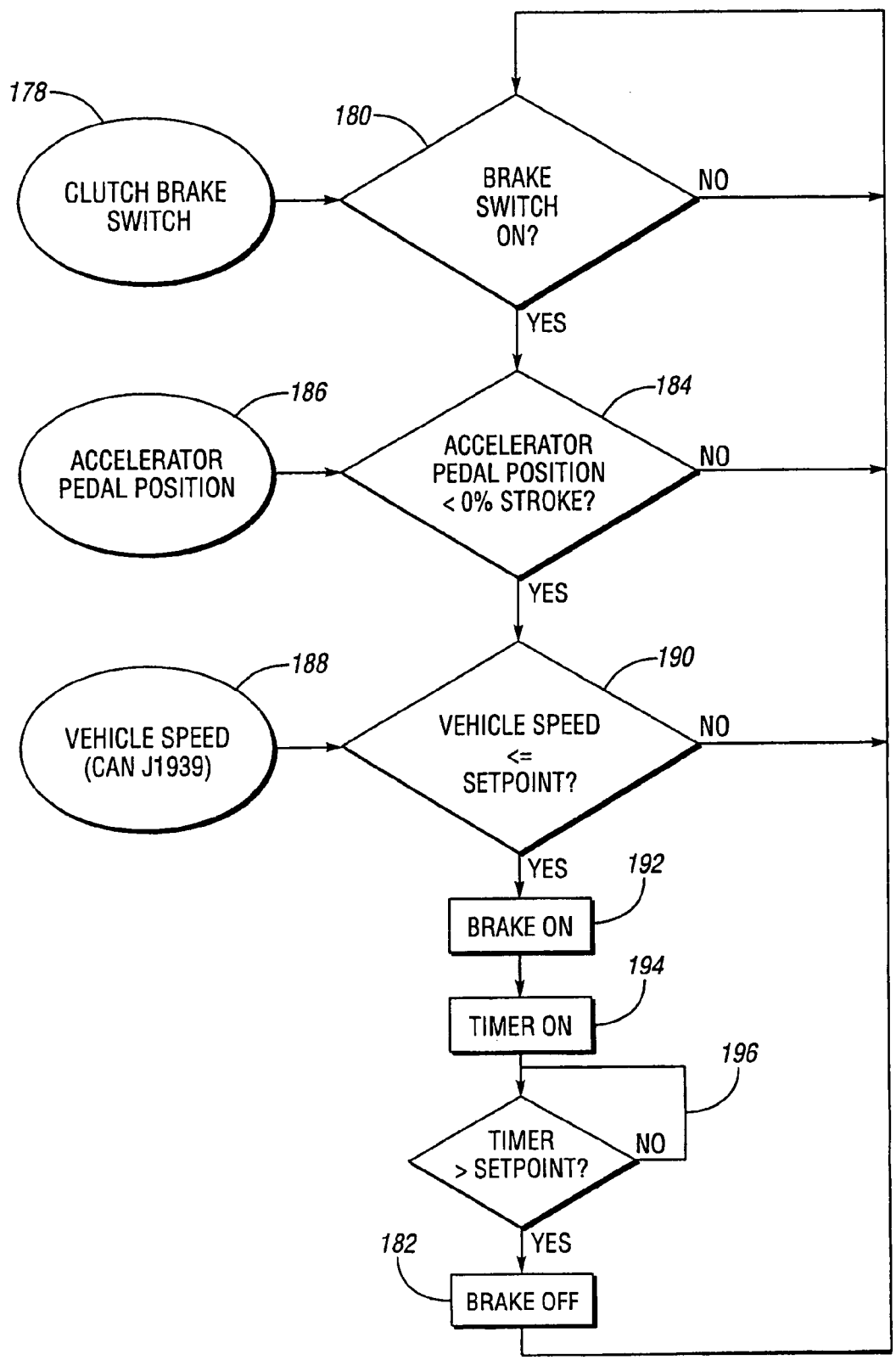
FIG. 10 is an alternative embodiment of a software flow diagram demonstrating the input shaft electromagnetic brake control strategy for the electromagnetic brake of FIG. 5.

In FIG. 10, an alternative control algorithm strategy is illustrated. The clutch brake switch 178 may be remotely located anywhere that the operation of the clutch brake device can be controlled. For example, the switch 178 can be placed to monitor the position of the master cylinder of the hydraulic linkage, the slave cylinder of the hydraulic linkage, clutch pedal, clutch release mechanism, or the like. The algorithm determines at 180 whether the clutch brake switch is "on." If it is not on, the control routine will maintain the brake in an "off" state, as shown at 182.

If the brake switch is on, the routine determines at decision block 184 whether the accelerator pedal is being depressed by the operator. This may be expressed in terms of the stroke position of the accelerator pedal wherein the pedal is not depressed when the pedal position is at 0% of its stroke. The accelerator pedal position is detected by a sensor at 186.

The vehicle speed is measured, as indicated at 188. If the engine speed is not within predetermined limits, the routine will maintain the brake in an "off" position, as shown at 182. A decision is made at decision block 190 to determine whether the vehicle speed, measured at 188, is less than a precalibrated set point. If the vehicle speed is higher than the set point, the brake will be kept "off" as shown at 182. If the vehicle speed is less than the set point, the brake is applied, as shown at 192.

When the brake is on, it is determined, as the routine continues, whether the timer is on. This is done at action block 194. If the timer is not timed out, the routine will continue, as shown at 196. If the timer value is greater than the set point, however, the brake will be kept off as shown at 182.

Referring to FIG. 11, an electromagnetic clutch brake control is illustrated that includes primary and secondary fall-back engagement counters. The features described, beginning at the instant in the strategy operation when the clutch brake switch is operated at 200, then determines if the connection to the datalink, such as the J1939 databus, is complete. If a databus fault is not detected at 202, as would be expected in normal circumstances, the algorithm proceeds to confirm that the J1939 based protection limits are active at 204. The brake ON timer is activated at 206. The system determines if the conditions are appropriate for application of the clutch brake. The system determines at 208 whether the protective inputs from the databus, such as the J1939 engine speed, throttle position, vehicle speed timer and the like, are within the ranges at 210. If the inputs from the databus are appropriate for engagement, the system also checks to determine at 208 that the brake ON timer is enabled. If so, the brake is engaged at 212. Upon brake engagement, the primary clutch brake counter is incremented at 214 and the system returns to "start." If the conditions are not appropriate for application of the clutch brake at 208, the system returns to "start" without applying the brake.

If a databus fault is detected at 202, the system then proceeds at 220 to set a flag indicating that the J1939 based protection limits are deactivated. The system is still enabled even without the J1939 based protection limits and proceeds at 222 to set the brake ON timer to its active state. The system then determines at 224 whether the conditions are appropriate for application of the clutch brake with reference only to the brake ON software timer. If the brake ON timer is appropriate for application of the brake, the system proceeds to apply the brake at 226. Following application of the brake at 226, the secondary, or fall-back mode, counter is incremented at 228. The system then returns to "start" for the next cycle. If conditions are not appropriate for application of the clutch brake at 224, the system returns to the "start" without applying the brake.

The brake ON timer, referenced at 206 or 222, limits the duration the clutch brake power is applied for a single activation of the clutch brake switch. Once the timer times out, the clutch brake is turned off. The brake ON timer is set when the clutch brake switch is opened.

The control for the electromagnetic brake described with reference to FIG. 11 provides a protection algorithm that can use any signals that may be available from the CAN based J1939 datalink, or the like. However, if the signals are not received from the datalink, the protection algorithm allows for a fall-back mode of operation for the electromagnetic clutch brake that allows it to continue to operate even without the inputs from the datalink. The system is permitted to operate based upon receipt of the input signal from the clutch brake activation switch. In the fall-back mode, there is less protection for the electromagnetic brake, which may result in excessive wear due to activations under conditions that would normally be prohibited by the protection algorithm.

The number of activations of the brake with the protection algorithm utilizing the input signals from the datalink are counted on the primary clutch brake counter, at 214. The number of activations of the electromagnetic clutch brake without data being provided to the algorithm from the datalink are counted on the secondary, or fall-back mode, counter, at 228.

At service intervals, the counters may be inspected. Upon inspection, it may be determined whether the clutch brake will operate without the datalink protection limit at any time during the clutch brake life. If so, it may be determined how many activations occur by checking the secondary, or fall-back mode, counter. This information may be used to diagnose clutch brake wear causes and provide other information regarding usage and wear of the electromagnetic clutch brake.

Although an embodiment of the invention has been described, it will be apparent to persons skilled in the art that modifications may be made without departing from the scope of the invention. All such modifications and equivalents thereof are intended to be covered by the following claims.

What is claimed is:

1. An electromagnetic brake for a vehicle powertrain for a wheeled vehicle, the powertrain comprising an engine, a multiple-ratio power transmission having a housing enclosing multiple-ratio gear elements, a power output shaft driveably connected to vehicle traction wheels, a power input shaft driveably connected to the multiple-ratio gear elements and a master clutch selectively connecting the power input shaft to the engine, the master clutch being enclosed by a master clutch housing forming a part of the transmission housing, the electromagnetic brake comprising:

a stator coil housing secured to the transmission housing, the stator coil housing enclosing a stator coil surrounding the power input shaft and defining with the stator coil housing an electromagnetic pole face;

a stator coil circuit including a voltage source and a switch for opening and closing the stator coil circuit;

an armature plate having a hub portion secured to the power input shaft and a peripheral portion disposed adjacent the stator coil;

a control system for electrically energizing the stator coil thereby effecting frictional engagement of the armature plate with the pole face as an electromagnetic flux flow path is established around the stator coil through the stator coil housing and the peripheral armature plate portion;

the control system further including a protective circuit that is adapted to receive at least one data input from a databus, the protective circuit determining whether the data input is within a predetermined range that is appropriate for energizing the stator coil, and wherein the protective circuit further comprises a fallback mechanism in communication with the stator coil to permit operation of the electromagnetic brake when no data input is received from the databus.

2. An electromagnetic brake according to claim 1 wherein a plurality of data inputs is received from the databus, the data inputs comprises at least one of an engine speed data input, a throttle position data input, and a vehicle speed timer input.

3. The electromagnetic brake of claim 1 wherein the fallback mechanism in the protective circuit further comprises a software timer that times the period during which the stator coil for the electromagnetic brake is energized.

4. The electromagnetic brake of claim 1 wherein fallback mechanism in the protective circuit further comprises a software timer that times the duration of electromagnetic brake application to permit operation of the electromagnetic brake when no data input is received from the databus.

5. The electromagnetic brake of claim 1 further comprising a primary counter that is incremented each time the electromagnetic brake is applied as the data inputs are received from the databus.

6. The electromagnetic brake of claim 5 further comprising a secondary counter that is incremented each time the electromagnetic brake is applied while the data input from the databus is unavailable.

7. An electromagnetic brake for a vehicle powertrain for a wheeled vehicle, the powertrain comprising an engine, a multiple-ratio power transmission having a housing enclosing multiple-ratio gear elements, a power output shaft driveably connected to vehicle traction wheels, a power input shaft driveably connected to the multiple-ratio gear elements and a master clutch selectively connecting the power input shaft to the engine, the master clutch being enclosed by a master clutch housing forming a part of the transmission housing, the electromagnetic brake comprising:

a stator coil housing secured to the transmission housing, the stator coil housing enclosing a stator coil surrounding the power input shaft and defining with the coil housing an electromagnetic pole face;

a stator coil circuit including a voltage source and a switch for opening and closing the stator coil circuit;

an armature plate having a hub portion secured to the power input shaft and a peripheral portion disposed adjacent the stator coil;

a control system for electrically energizing the stator coil thereby effecting frictional engagement of the armature plate with the pole face as an electromagnetic flux flow path is established around the stator coil through the stator coil housing and the peripheral armature plate portion;

the control system further including a protective circuit that is adapted to receive at least one data input from a databus, the protective circuit determining whether the data input is within a predetermined range that is appropriate for energizing the stator coil wherein the protective circuit further comprises a software timer that times the period during which the stator coil for the electromagnetic brake is energized.

8. An electromagnetic brake according to claim 7 wherein a plurality of data inputs is received from the databus, the data inputs comprising comprises at least one of an engine speed data input, a throttle position data input, and a vehicle speed timer input.

9. The electromagnetic brake of claim 7 further comprising a primary counter that is incremented each time the electromagnetic brake is applied as the data inputs are received from the databus.

10. The electromagnetic brake of claim 9 further comprising a secondary counter that is incremented each time the brake is applied while the data input from the databus is unavailable.

11. An electromagnetic brake for a vehicle powertrain for a wheeled vehicle, the powertrain comprising an engine, a multiple-ratio power transmission having a housing enclosing multiple-ratio gear elements, a power output shaft driveably connected to vehicle traction wheels, a power input shaft driveably connected to the multiple-ratio gear elements and a master clutch selectively connecting the power input shaft to the engine, the master clutch being enclosed by a master clutch housing forming a part of the transmission housing, the electromagnetic brake comprising:

a stator coil housing secured to the transmission housing, the stator coil housing enclosing a stator coil surrounding the power input shaft and defining with the coil housing an electromagnetic pole face;

a stator coil circuit including a voltage source and a switch for opening and closing the stator coil circuit;

an armature plate having a hub portion secured to the power input shaft and a peripheral portion disposed adjacent the stator coil;

a control system for electrically energizing the stator coil thereby effecting frictional engagement of the armature plate with the pole face as an electromagnetic flux flow path is established around the stator coil through the stator coil housing and the peripheral armature plate portion;

the control system further including a protective circuit that is adapted to receive at least one data input from a databus, the protective circuit determining whether the data input is within a predetermined range that is appropriate for energizing the stator coil, wherein the protective circuit permits operation of the electromagnetic brake when no data input is received from databus, and wherein the protective circuit includes a software timer that times the duration of brake application.

12. An electromagnetic brake according to claim 11 wherein a plurality of data inputs is received from the databus, the data inputs comprises at least one of an engine speed data input, a throttle position data input, and a vehicle speed timer input.

13. The electromagnetic brake of claim 11 wherein the protective circuit further comprising a primary counter that is incremented each time the brake is applied as the data inputs are received from the databus.

14. The electromagnetic brake of claim 13 wherein the protective circuit further comprise a secondary counter that is incremented each time the brake is applied while the data input from the databus is unavailable.

* * * * *

UNITED STATES PATENT AND TRADEMARK OFFICE
CERTIFICATE OF CORRECTION

| | | |
|---|---|---|
| PATENT NO. | : 8,057,358 B2 | Page 1 of 1 |
| APPLICATION NO. | : 11/900494 | |
| DATED | : November 15, 2011 | |
| INVENTOR(S) | : Michael J. Hornbook et al. | |

It is certified that error appears in the above-identified patent and that said Letters Patent is hereby corrected as shown below:

Column 12, Line 51, Claim 8:

After "the data inputs comprising"
Delete "comprises".

Signed and Sealed this
Sixth Day of March, 2012

David J. Kappos
*Director of the United States Patent and Trademark Office*